United States Patent [19]

Nuss

[11] Patent Number: 4,648,620

[45] Date of Patent: Mar. 10, 1987

[54] ADJUSTABLE SUSPENSION STABILIZER BAR

[75] Inventor: Sheldon E. Nuss, Farmington Hills, Mich.

[73] Assignee: Ford Motor Company, Dearborn, Mich.

[21] Appl. No.: 736,184

[22] Filed: May 20, 1985

[51] Int. Cl.⁴ ............................................. B60G 11/18
[52] U.S. Cl. ................................. 280/689; 280/665; 280/684; 280/707; 280/709
[58] Field of Search ............... 280/689, 723, 684, 695, 280/700, 721, 697, 11 R, 710, 665, 726, 709, 725, 707; 180/169

[56] References Cited

U.S. PATENT DOCUMENTS

| | | | |
|---|---|---|---|
| 2,660,449 | 11/1953 | MacPherson | 280/665 |
| 3,003,783 | 10/1961 | Brueder | 280/707 |
| 3,181,885 | 5/1965 | Baracos et al. | 280/723 |
| 3,197,233 | 7/1965 | Winsen et al. | 280/112 A |
| 3,292,918 | 12/1966 | Hart | 267/11 R |
| 3,337,236 | 8/1967 | Peterson | 280/723 |
| 3,490,786 | 1/1970 | Ravene | 280/721 |
| 3,589,700 | 6/1971 | Ruet et al. | 280/6 H |
| 3,608,925 | 9/1971 | Murphy | 280/112 A |
| 3,733,087 | 5/1973 | Allison | 280/664 |
| 4,066,278 | 1/1978 | Takagi | 280/710 |
| 4,143,887 | 3/1979 | Williams et al. | 280/697 |
| 4,206,935 | 6/1980 | Sheppard | 280/723 |
| 4,402,375 | 9/1983 | Glaze | 180/169 |

FOREIGN PATENT DOCUMENTS 1160313 12/1963 Fed. Rep. of Germany .
2053649 5/1972 Fed. Rep. of Germany ...... 280/723

Primary Examiner—Richard A. Bertsch
Attorney, Agent, or Firm—Jerome R. Drouillard; Roger L. May

[57] ABSTRACT

An adjustable stabilizer bar for a vehicle comprises a primary torsional reaction segment, means for operatively connecting the primary reaction segment with the suspension of vehicle roadwheels such that the primary reaction segment will be torsionally loaded during jounce and rebound motion of the roadwheels, and means for selectively modifying the torque reactive capacity of the primary reaction segment. The torque reactive capacity of the primary reaction segment may be modified in response to manual or automatic controls.

15 Claims, 3 Drawing Figures

4,648,620

ADJUSTABLE SUSPENSION STABILIZER BAR

BACKGROUND OF THE INVENTION

1. Field of the Invention

This invention relates to an adjustable stabilizer bar for a vehicle.

2. Description of Related Art

Torsional stabilizer bars have proven useful in vehicles for many years. Such stabilizer bars commonly employ a transverse torsion bar segment pivotally attached to the vehicle chassis and leading or trailing longitudinal segements attached to a control arm or wheel carrier. Examples of stabilizer bars having this particular configuration are shown in U.S. Pat. Nos. 2,660,449, 3,181,885, 3,733,087, 4,066,278, and 4,143,887. These stabilizers act in a manner such that when a pair of left and right wheels differ in level from each other due to a cornering maneuver. the vehicle body will be prevented from excessive rolling or leaning to either side by the torsional resistance produced in the stabilizer bar.

In response to the driving public's demand for more "sporty" cornering capability, automotive designers have increased the diameters of conventional stabilizer bars. Although this modification beneficially increases roll stiffness, it also degrades ride quality in many cases. This results because the stabilizer couples the wheels together. For example, when one wheel strikes a raised obstruction in the roadway during straight running, the body will tend to roll more when a stronger or stiffer stabilizer is used than when a bar of lesser torsional stiffness is fitted.

Designers have sought to enhance the function of stabilizer bars in a variety of ways. U.S. Pat. No. 4,206,935 discloses a non-adjustable stabilizer bar with two halves which may be selectively coupled or entirely decoupled by means of a clutch mechanism. This stabilizer cannot produce varied degrees of stabilization. U.S. Pat. No. 3,197,233 discloses an active stabilizer system in which a bifurcated stabilizer bar is loaded torsionally by a hydraulic motor joining the two furcations. This system is limited because it requires an external pump driven by the vehicle's engine. It is further limited because torsional bias can be applied only when the vehicle is in a leaning situation; application of the bias when the vehicle is operating in a straight-ahead mode will cause the body to roll to one side. This necessarily limits the flexibility of the control strategy of the device.

U.S. Pat. No. 3,292,918 discloses a variable rate stabilizing assembly comprising a transversely mounted multipiece leaf spring coupled at its ends to the swing axle of an independent rear suspension. The roll stiffness produced by this system is not adjustable while the vehicle is in motion.

U.S. Pat. No. 3,490,786 discloses a variable action anti-roll mechanism in which a longitudinal segment of a stabilizer bar is selectively coupled to a transversely running torsional reaction segment. The stabilization capability of this system is limited by the stiffness of the simple transverse torsional reaction segment.

U.S. Pat. No. 3,589,700 discloses a flexibility corrector for a vehicle suspension system in which a resilient member mounted to a stabilizer bar alters the suspension spring rate when the wheels of the suspension move into jounce or rebound positions. U.S. Pat. No. 3,337,236 discloses a suspension having variable rate torsion bar springs but no stabilizer feature. Finally, German Auslegeschrift No. 1,160,313 discloses an adjustable torsion bar suspension including ride height control.

It is an object of the present invention to provide an adjustable stabilizer bar which does not require an engine driven pump and which permits either the driver or an automatic system to select the desired stiffness of the torsional reaction segment of the stabilizer bar. This allows a less powerful stabilizer bar to be employed in the normal course of events while permitting a stiffer bar to be used according to the driver's wishes or the dictates of the road.

SUMMARY OF THE INVENTION

According to the present invention, an adjustable stabilizer bar for a vehicle having multiple road wheels comprises a primary torsional reaction segment, means for operatively connecting the primary reaction segment with the suspension of the vehicle's road wheels such that the primary reaction segment will be torsionally loaded during jounce and rebound motion of the road wheels, and means for selectively modifying the torque reactive capacity of the primary reaction segment. More particularly, one or more secondary torsional reaction segments is provided with associated means for selectively adding the torque reaction capacity of each secondary segment to the torque reaction capacity of the primary segment. The means for selectively adding the reaction capacity of the secondary segments to that of the primary segment comprises means for interconnecting the secondary and primary segments which may, for example, comprise a clutch system adapted to prevent the various segments from rotating with respect to each other when the clutch is engaged. The clutch mechanism is responsive to either manual or automatic control means or both. The selectively employable secondary reaction segments permit the stabilizer bar to function as a small-diameter bar when road conditions or driving maneuvers dictate this modality, while providing a more powerful stabilizer in response to yet other road conditions of driving modes.

The adjustable stabilizer bar of the present invention is compatible for use with either manual or automatic control means. Automatic control means could include, for example, the sensing of lateral acceleration during cornering maneuvers. An example of such sensing used in combination with a vehicle leveling system is shown in U.S. Pat. No. 3,608,925.

The stabilizer bar of the present invention provides for adjustable multi-rate stabilization. The rate selection may be performed by either the driver or by an automatic control system which may sense vehicle velocity, lateral acceleration or any other suitable operating variable. This stabilizer bar is of simple construction and has built-in "limp home" capability inasmuch as even were the operating mechanism of the bar to fail, the stabilization force produced by the torsional reaction segment will remain constant at one of the system's selected values.

DESCRIPTION OF PREFERRED EMBODIMENT

Figure 1:
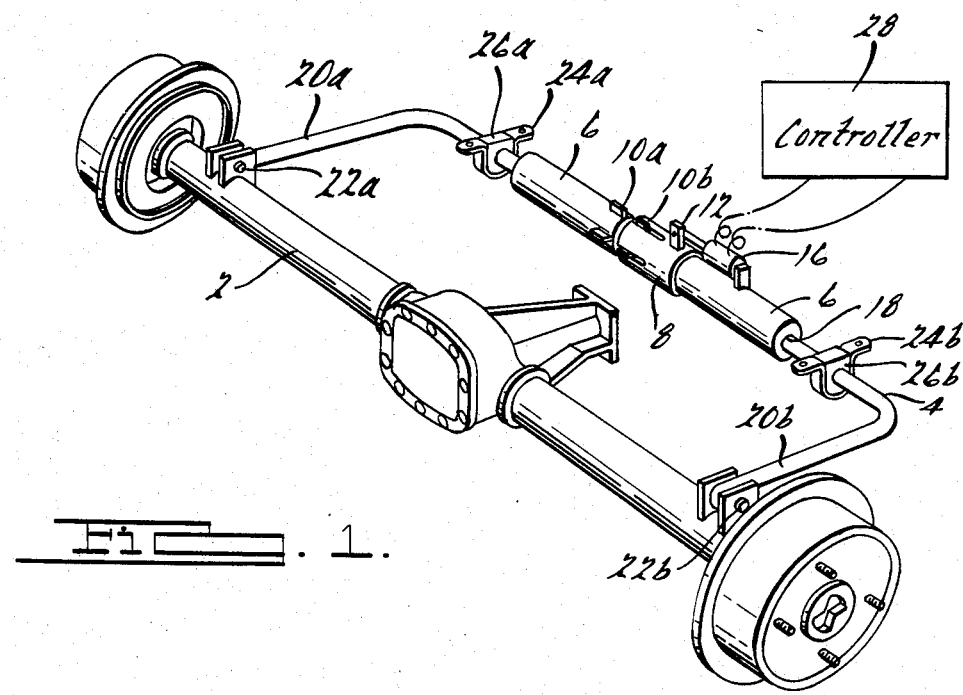
FIG. 1 is a perspective view of an adjustable stabilizer bar according to the present invention showing the stabilizer bar attached to a vehicle axle.

In a preferred embodiment shown in FIG. 1, primary torsional reaction segment 4 is comprised of a bar pivoted to the chassis by means of isolating mounts 26a and 26b which are bracketed to the chassis by means of brackets 24a and 24b. Primary torsional reaction segment 4 may have a circular or an annular cross section or any other cross section known to those skilled in the art.

Primary torsional reaction segment 4 is unitary with longitudinal legs 20a and 20b which serve to attach primary reaction segment 4 to axle assembly 2. Longitudinal legs 20a and 20b are pivoted to axle assembly 2 at pivots 22a and 22b. Those skilled in the art will appreciate that longitudinal legs 20a and 20b need not be unitary with primary torsional reaction segment 4 and could, for example, comprise linkages of various types known to those skilled in the art.

Although the configuration shown in FIG. 1 is that of a conventional beam-type rear axle of a rear drive automobile, the stabilizer bar of the present invention can be used with a front or rear suspension having either independent or beam-type construction. Further, the stabilizer bar of the present invention is suitable for use either leading or trailing wheels to which it is connected. In any event, the stabilizer bar will incorporate means for communicating the torsional reaction segment with part of a road wheel suspension subject to displacement during jounce and/or rebound movement of the vehicle's road wheels.

As shown in each of the Figures, the stabilizer bar of the present invention also includes means for selectively modifying the torque reactive capacity of the primary reaction segment. This means includes one or more secondary torsional reaction segments and associated means for selectively adding the torque reaction capacity of one or more of said secondary reaction segments to the torque reaction capacity of the primary segment. For example, the preferred embodiment shown in the Figures includes a secondary torsional reaction segment comprising a bifurcated tubular member 6 and a clutch for selectively coupling the coadjacent ends of the bifurcated tubular member. Although a bifurcated tubular member is shown, those skilled in the art will appreciate that multiple tubular members could be used to produce a cascaded increase in torsional stiffness of the primary torsional reaction segment.

Bifurcated tubular member 6 is coaxial with as well as coextensive with a substantial portion of primary reaction segment 4. Tubular member 6 is welded at its distal or nonadjacent ends to the primary reaction segment. Because tubular member 6 has an inside diameter sized to be a slip fit on the outside diameter of the primary reaction segment, operation of the stabilizer bar with the clutch mechanism disengaged will be characterized by a torsional reaction identical to that reaction which would be produced were the primary torsional reaction segment to exist without the tubular member and clutch. Engagement of the clutch mechanism produces a torsionally stiffer stabilizer bar by adding the torque reactive capacity of the much heavier tubular secondary reactive member to that of the primary reaction segment.

Those skilled in the art will appreciate that the torsional reaction segments may be constructed of any suitable material such as various ferrous or non-ferrous metals, or non-metallic materials such as fiber reinforced plastic composites.

Figure 2:
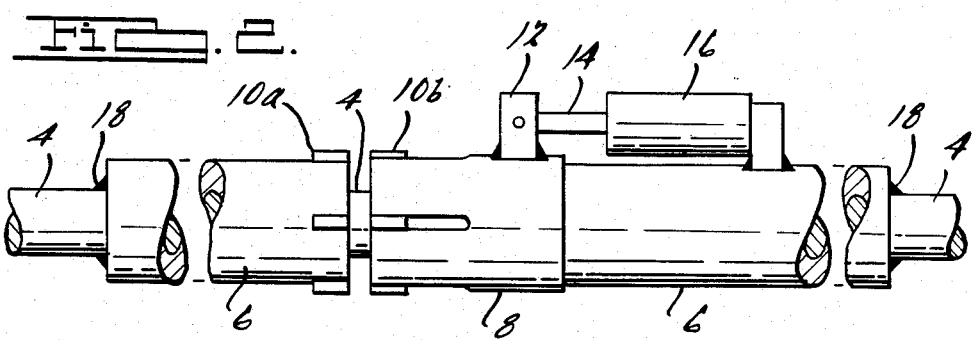
FIG. 2 is an enlarged view of a suitable clutch mechanism of the stabilizer bar showing the clutch in the disengaged position.
Figure 3:
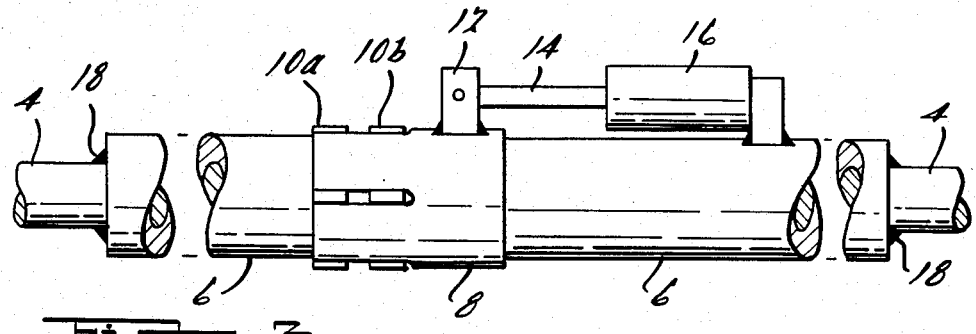
FIG. 3 is an enlarged view similar to FIG. 2 showing the clutch in the engaged position.

As shown with particularity in FIGS. 2 and 3, the clutch mechanism preferably comprises a plurality of dogs 10a and 10b mounted to the two halves of the bifurcated tubular member, and sliding clutch sleeve 8 which is piloted upon the outside diameter of tubular member 6 and driven by motor 16 by means of pushrod 14 and attaching lug 12. Motor 16 may be driven by any one of several well known mechanisms such as an electrical solenoid shown in FIG. 1 or by any of the several hydraulic or pneumatic devices familiar to those skilled in the art. Motor 16 is double acting so that sliding clutch sleeve 8 may be both engaged as shown in FIG. 3, or disengaged, as shown in FIG. 2, by motor 16. Those skilled in the art will appreciated that many alternative clutch arrangements may be used with the present invention inasmuch as the clutch functions to simply innerconnect the primary and secondary reactive segments and thus to prevent the various segments from rotating with respect to each other when the torsional reaction segment is subjected to torque loads. For example, the clutch could be interposed between one end of a unitary tubular member and the primary reaction segment.

Controller 28 preferably embodies both manual and automatic control capabilities. Manual control permits the operator of the vehicle to selectively employ the secondary torsional reaction system. The driver's choice to employ this system can be made on the basis of road conditions or to suit has taste regarding the road stiffness desired for his vehicle. The vehicle operator may select the desired mode by positioning an instrument panel switch in the appropriate position. This will energize the solenoid or fluid motor to shift the sliding clutch in the chosen position.

Automatic operation of the controller would preferably be based upon the sensing by the controller, or by associated sensors, of such parameters as vehicle speed or lateral acceleration encountered during turning maneuvers. The controller may thus be used to adapt the roll stiffness of the suspension system to the dictates of the road surface and the driver.

When used herein, the term "chassis" means conventional automotive chassis as well as conventional unitized automotive body structures.

Variations and modifications of the present invention are possible without departing from the spirit and scope of the invention as defined by the appended claims.

I claim:

1. An adjustable stabilizer bar for a vehicle having multiple roadwheels comprising:

a primary torsional reaction segment;

means for operatively connecting said primary reaction segment with the suspension of said roadwheels such that said primary reaction segment will be torsionally loaded during jounce and rebound motion of said roadwheels; and means for selectively modifying the torque reactive capacity of said primary reaction segment, said means comprising one or more secondary torsional reaction segments and associated means for selectively adding the torque reaction capacity of one or more of said secondary segments to the torque reaction capacity of said primary segment.

2. The adjustable stabilizer bar of claim 1 wherein said means for selectively adding the torque reaction capacity of said one or more secondary segments to the torque reaction capacity of said primary segment comprises means for interconnecting said secondary segments with said primary segments.

3. The adjustable stabilizer bar of claim 2 wherein said means for interconnecting said segments is operable by the driver of the vehicle.

4. The adjustable stabilizer bar of claim 2 wherein said means for interconnecting said segments is operable by an automatic control system.

5. The adjustable stabilizer bar of claim 2 wherein said means for interconnecting said segments comprises a selectively engageable clutch linking said primary segment and one or more of said secondary segments.

6. The adjustable stabilizer bar of claim 5 wherein said clutch is adapted to prevent said segments from rotating with respect to each other when said clutch is engaged.

7. A suspension system for a vehicle having multiple road wheels comprising an adjustable stabilizer bar, which stabilizer bar comprises:
- a primary torsional reaction segment pivoted to the chassis of said vehicle;
- linkage connecting said primary reaction segment with the suspension of said roadwheels such that said primary reaction segment will be torsionally loaded during jounce and rebound motion of said roadwheels; and
- means for selectively increasing the torque reactive capacity of said primary reaction segment, said means comprising one or more secondary tubular reaction segments encasing a portion of said primary reaction segment and associated means for interconnecting said primary and secondary reaction segments.

8. The system of claim 7 wherein said means for interconnecting said primary and secondary reaction segments is responsive to the forward velocity of said vehicle.

9. The system of claim 7 wherein said means for interconnecting said primary and secondary reaction segments is responsive to lateral acceleration of said vehicle.

10. The system of claim 7 wherein said means for interconnecting said primary and secondary reaction segments is responsive to a manually operable control switch actuatable by the vehicle's driver.

11. The system of claim 7 wherein said means for interconnecting said segments comprises one or more clutch assemblies.

12. The system of claim 11 wherein said one or more clutch assemblies comprise:
  (i) one or more dogs mounted upon said primary segment and one or more dogs mounted upon one or more of said secondary segments; and
  (ii) means for locking said dogs together so as to prevent relative rotation of said primary segment with respect to one or more of said secondary segments.

13. The system of claim 12 wherein said means for locking said dogs together comprises a sliding member engagable with said dogs mounted upon said primary segment and at least one of said secondary segments.

14. The system of claim 13 wherein said sliding member is driven by a fluid motor.

15. The system of claim 13 wherein said sliding member is driven by an electric solenoid motor.

* * * * *